United States Patent [19]
Chaussy et al.
[11] 4,063,432
[45] Dec. 20, 1977

[54] FREEZING AND COLD-STORAGE INSTALLATION

[75] Inventors: Roland Chaussy, Migennes; Jean Paoli, Paris, both of France

[73] Assignee: Agence Nationale de Valorisation de la Recherche (ANVAR), France

[21] Appl. No.: 681,407

[22] Filed: Apr. 29, 1976

[30] Foreign Application Priority Data

Apr. 30, 1975 France ..................... 75.13568
Apr. 14, 1976 France ..................... 76.10974

[51] Int. Cl.[2] ..................... F25D 17/06
[52] U.S. Cl. ..................... 62/419; 62/441
[58] Field of Search ..................... 62/407, 419, 426, 440, 62/441, 442, 329, 417

[56] References Cited

U.S. PATENT DOCUMENTS

| | | | |
|---|---|---|---|
| 1,833,034 | 11/1931 | Parker | 62/329 |
| 2,437,451 | 3/1948 | Baird | 62/441 X |
| 2,696,086 | 12/1954 | Jones | 62/419 X |
| 2,739,545 | 3/1956 | Nelson | 62/419 X |
| 2,814,983 | 12/1957 | Burgess | 62/419 X |
| 2,825,211 | 3/1958 | Gessel | 62/419 X |
| 3,070,976 | 1/1963 | Guhl | 62/419 X |

*Primary Examiner*—Ronald C. Capossela
*Attorney, Agent, or Firm*—Stevens, Davis, Miller & Mosher

[57] ABSTRACT

A cold storage installation having a part thereof which is available for rapid freezing consists of a number of open compartments which are disposed one following the other and intercommunicating. Certain consecutive compartments are associated with means such as fans for creating air circulation conditions necessary for their utilization as freezing spaces. These consecutive compartments are adapted to be covered in longitudinally, possibly by fixed walls and movable elements associated with the compartments or possibly in part at least by elements on pallets to be located in the compartments.

The freezing compartments are preferably upstream of the refrigerating equipment which may be located in an upper passage.

The whole array of compartments is preferably provided with corridors, air circulation passages being located parallel to the corridors and transversely at the ends of the corridors.

11 Claims, 9 Drawing Figures

FIG.:2

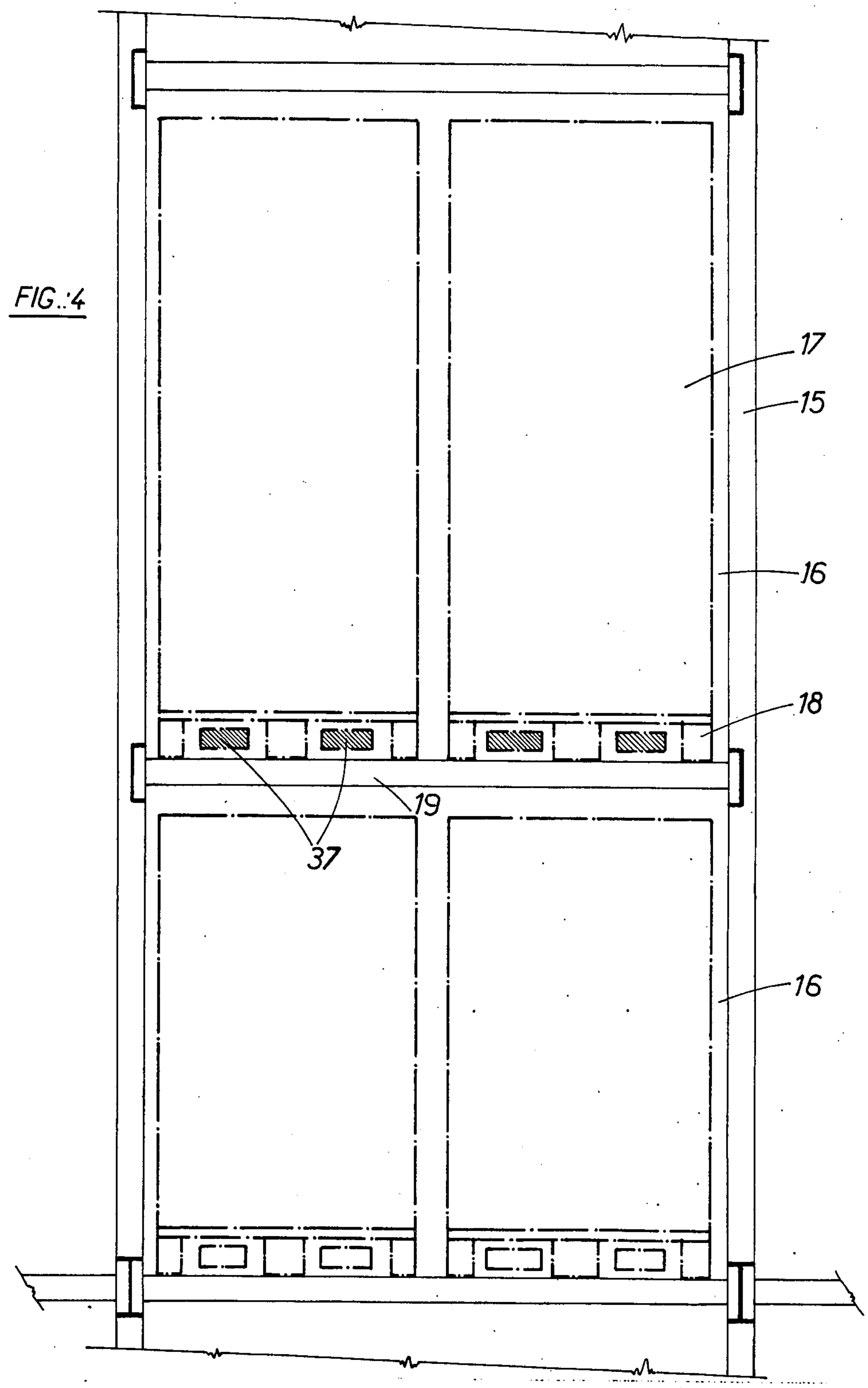
FIG.:4
17
15
16
18
19
37
16

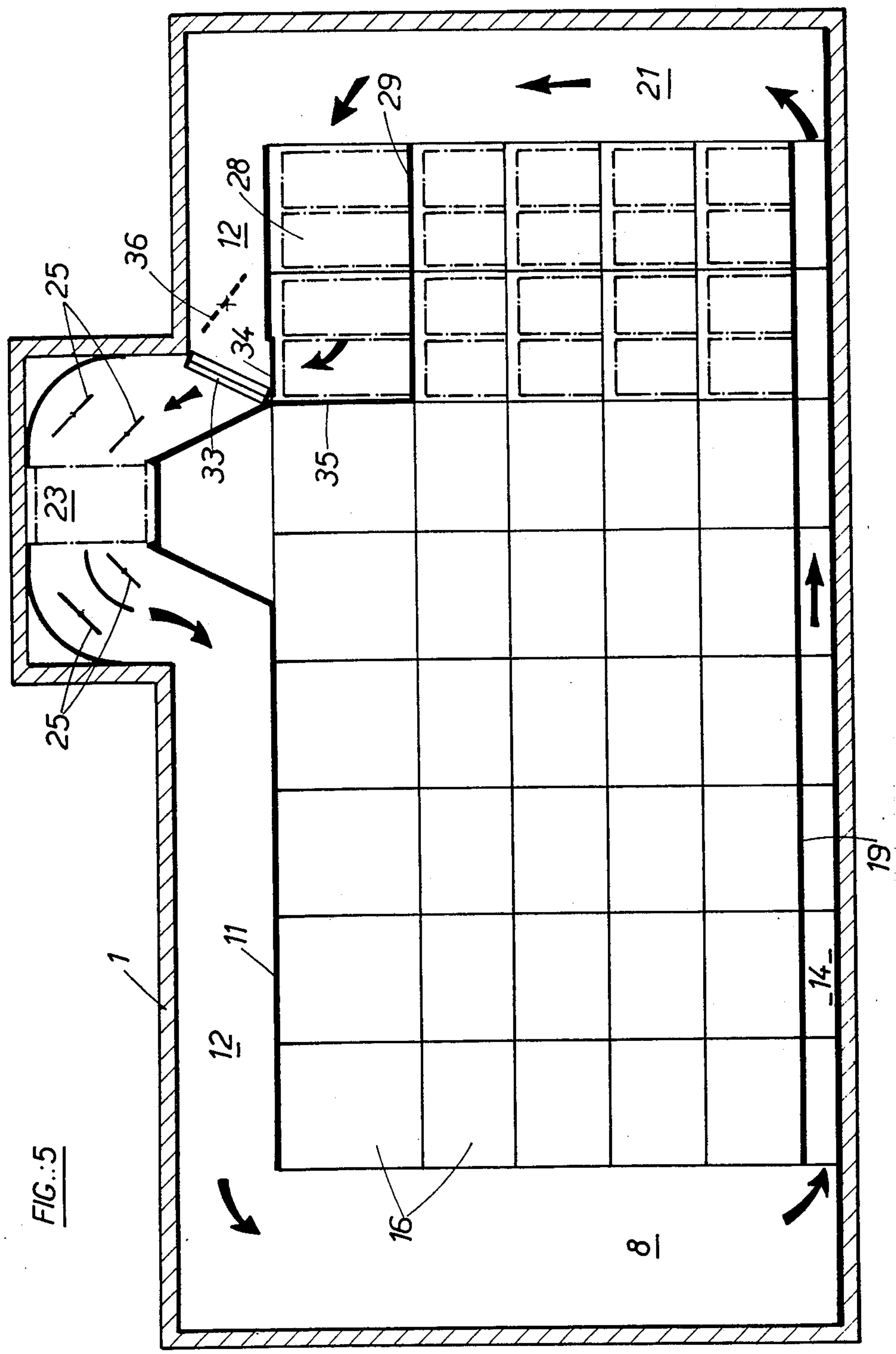
FIG.:5
1
8
11
12
12
14
16
19
21
23
25
25
28
29
33
34
35
36

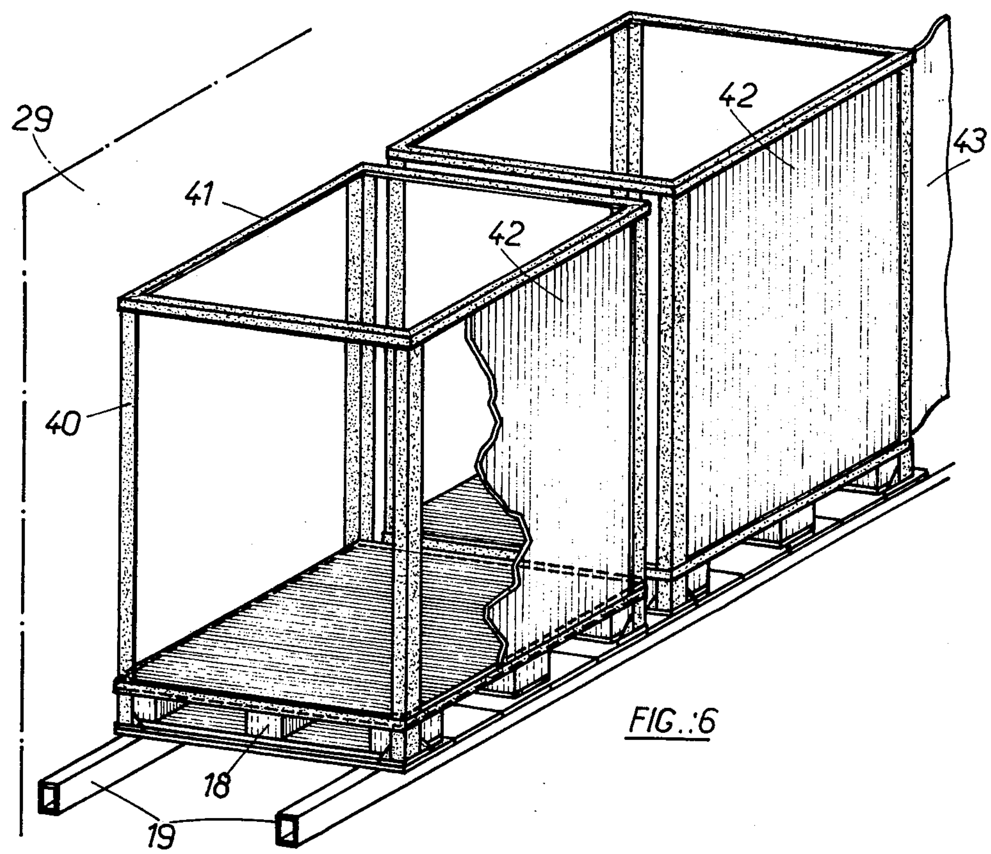
29
41
42
42
43
40
18
19
FIG.:6
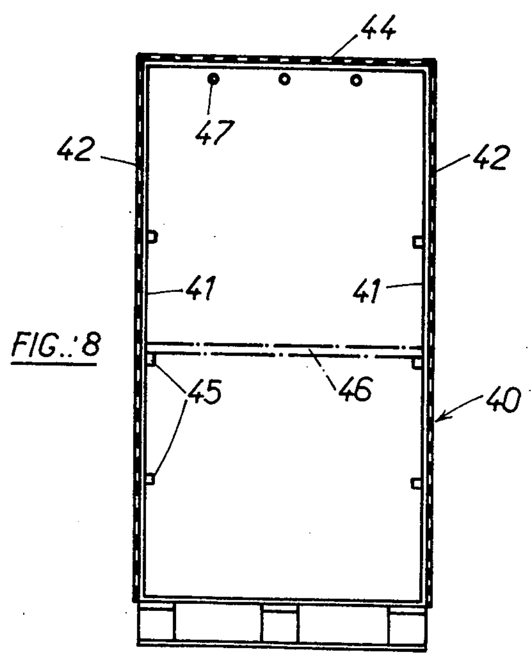
44
47
42
42
41
41
FIG.:8
45
46
40

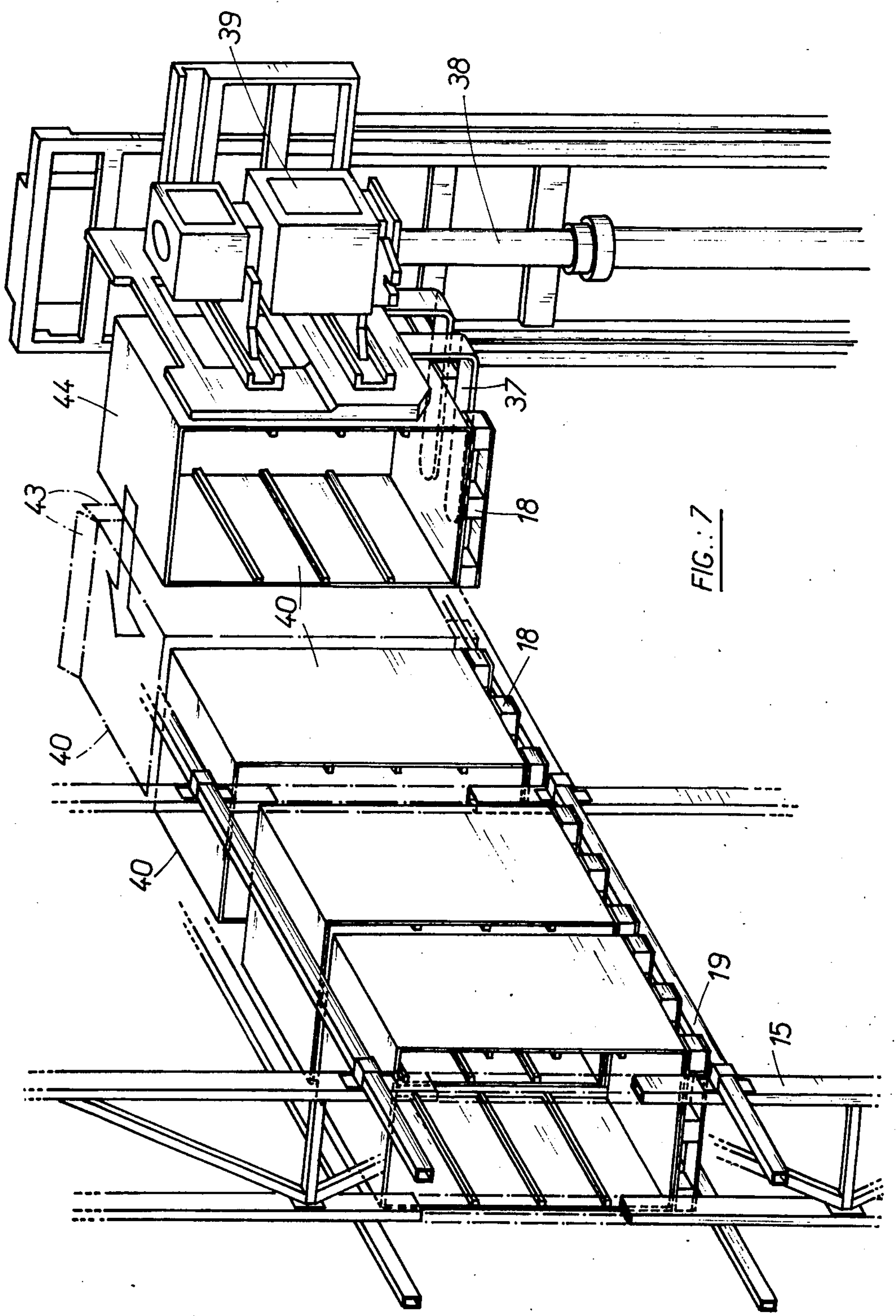
FIG.: 7

1
2
50
33
17
18
38
19
15
28
52
17
18
12
51
16
26
27

FREEZING AND COLD-STORAGE INSTALLATION

The present invention relates to the freezing and cold storage of products such as foodstuffs.

A cold storage generally comprises one or more storage cold rooms associated with one or more rapid freezing tunnels. The operating conditions of the cold storage rooms and the freezing tunnels are very different or even contradictory from many points of view, so that the construction and operation of cold stores are complicated and their cost is burdensome.

The essential aim of the present invention is to provide a freezing and cold-storage installation which will as far as possible be free from these disadvantages.

It is known that a cold room of conventional type must have a large capacity and therefore occupy a large area, particularly as products are stored therein in bays separated by longitudinal and transverse passages. Goods are brought in and taken out in limited quantities and at relatively short intervals, while nevertheless the refrigerating equipment must operate as regularly as possible in order to aviod the transfer of water vapour from one product to another and also loss of weight through evaporation. The requirements of cold are proportional to the outside temperature, and are therefore greater in the daytime than at night, and in summer than in winter. Finally, the velocity of the air relative to the products must be low in order to restrict evaporation and oxidation phenomena.

The freezing tunnel, on the other hand, has a smaller section and a smaller capacity and contains no passages serving to force the air to pass over the products. It functions intermittently and is filled with products at one time, while in addition its operation must be vigorous so that the products are rapidly acted on by the cold. The air is renewed when the goods are removed and others introduced, so that there are substantial frigorific losses. Requirements of cold are very considerable during solidification of the products, and smaller at the end of the freezing. These requirements are only slightly dependent on outside temperature. Great differences exist between the temperature of the freezing air and that of the products which are to be frozen, in order to promote heat exchange. A high velocity of the air makes it possible to obtain a better heat exchange between the product to be refrigerated and the refrigerating air.

The installation forming the object of the present invention is so arranged as to be able to carry out both freezing and storage functions, its various parts being combined in such a manner as to meet the above requirements with minimum inconvenience.

It comprises a room associated with refrigerating equipment which circulates air at low temperature therein, some of the spaces intended to receive the products being so arranged as to be subjected to a more intensive circulation of air than the other spaces, in order to enable them to be used for freezing, while the other spaces are then used for storing the frozen products; moreover, the spaces intended to receive the products are composed of open compartments disposed one following the other and communicating with one another from each one to the next, a plurality of consecutive compartments being adapted to be longitudinally covered in and associated with means which make it possible to create therein the air circulation conditions necessary for their utilisation as freezing compartments.

It is advantageous for the compartments to be disposed in longitudinal rows comprising a plurality of storeys, and for their dimensions to be so selected that products loaded on pallets can be placed therein, the rows being separated by corridors permitting the movement of devices serving for the handling of the said pallets. For preference the compartments intended for utilisation as freezing compartments, are situated, in each of the rows, on top storey and upstream of the refrigerating equipment.

In one embodiment the longitudinal enclosure of the compartments forming freezing tunnels is in the form of fixed and movable elements, for example walls and raisable or rolling shutters mounted on the compartment themselves.

In an alternative arrangement, at least part of the enclosure is formed by elements provided on the pallets on which the products to be frozen and stored are loaded.

For example the enclosure may comprise only walls fixed to the compartments, the movable element or elements permitting access to the tunnel and enabling the latter to be completed with the aid of raised structures provided on the pallets.

It is even possible to dispense with all fixed longitudinal enclosing elements by providing the raised structures of the pallets with side walls and a roof which, together with the pallet itself, form the main body of the tunnel when the pallets are in position in the compartments. Sealing means, such as flexible aprons, provided on the pallets or on the fixed elements of the installation, make it possible to ensure the continuity of the freezing tunnels. The raised structures may in addition facilitate the storage of products, for example by supporting racking or suspension elements.

Their presence does not in any way impair the preservation of the products when the pallets have been transferred from the freezing tunnel to a storage compartment, because these raised structures comprise only members directed longitudinally in relation to the currents of air. They can therefore only protect the said products.

The installation is particularly economical: a single refrigerating equipment for freezing and storage; no insulation for freezing spaces; recuperation for storage purposes of the losses of the part serving for freezing; convenient operation with minimum personnel.

The description which follows in conjunction with the accompanying drawings, which are given solely as non-limiting examples, will make it quite clear how the invention can be performed.

FIG. 4 is a partial section on the line IV-IV in FIG. 1;

FIG. 5 is a view in longitudinal section of a modified installation;

FIG. 6 is a diagrammatical view in perspective, partly broken away, showing pallets provided with raised structures on a single side wall;

FIG. 7 is a partial view in perspective of an installation equipped with pallets having enveloping raised structures, one of these pallets undergoing loading in a compartment, with the aid of a rotary-head apparatus;

FIG. 8 is a cross-section of a pallet having an enveloping raised structure;

Figure 1:
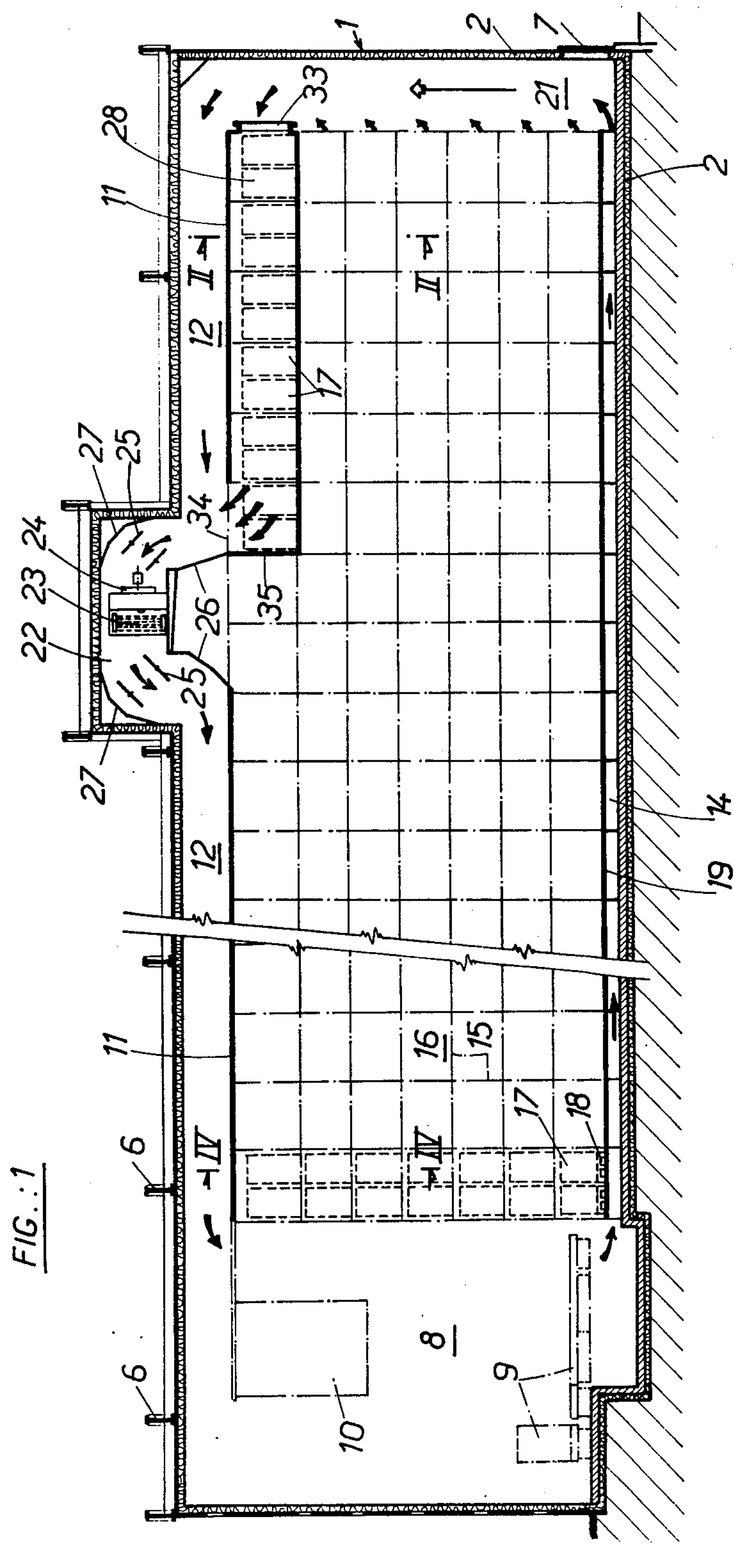
FIG. 1 is a view in longitudinal section of an installation according to the invention.
Figure 2:
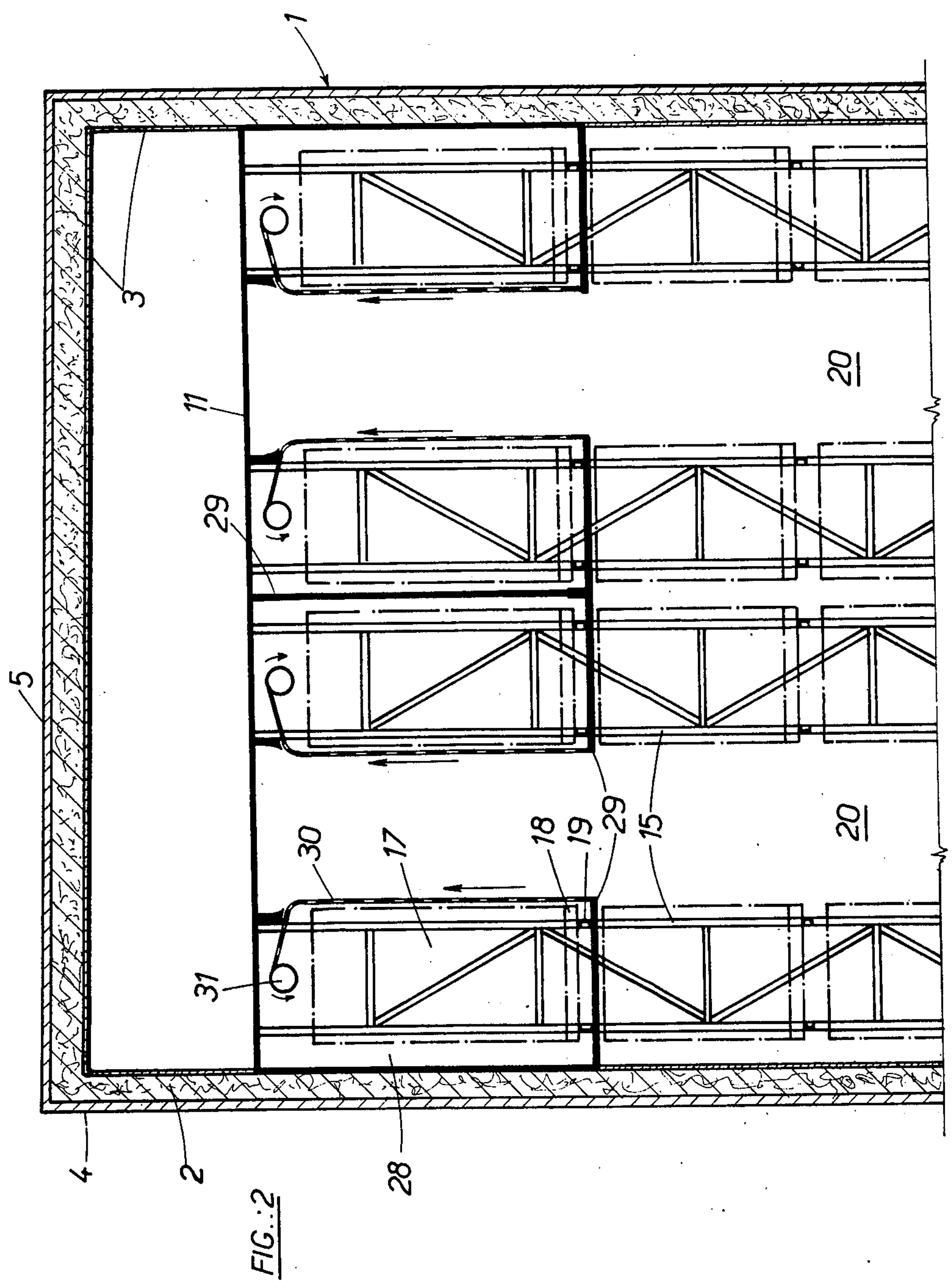
FIG. 2 is a partial section on the line II—II in FIG. 1.
Figure 3:
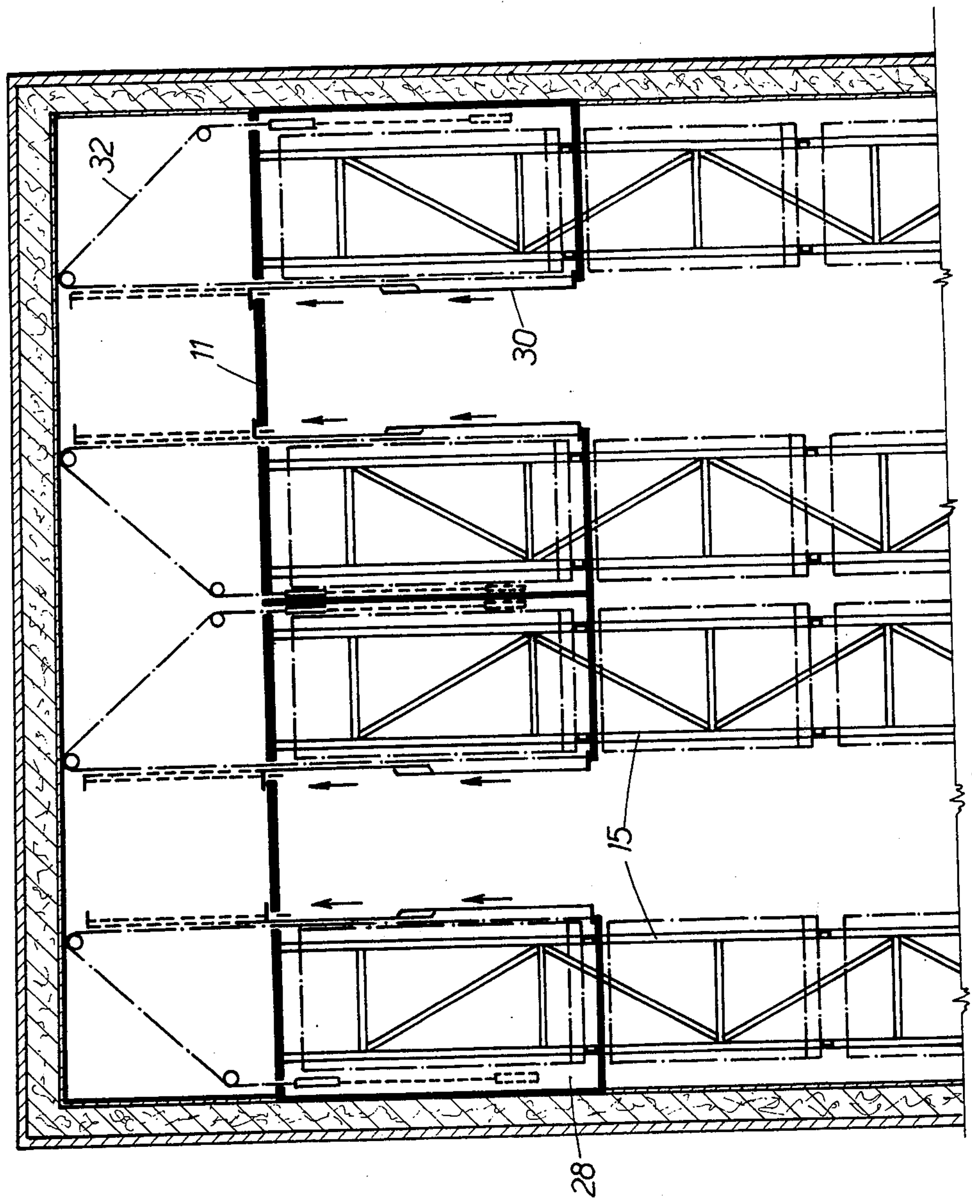
FIG. 3 is a similar view to FIG. 2, but relates to an alternative form of closure of the compartments serving for freezing.

In the embodiment illustrated in FIGS. 1 to 4 the installation comprises a room 1 the general shape of which is that of an elongated right parallelepiped having, for example, a width of about 10 meters, a height of about 15 meters, and a length which may be as much as 80 meters or more.

The sides, top and bottom of the room are provided with thermal insulation, for example with the aid of an insulating lining 2 interposed between inside cladding 3 and outside cladding 4 or a roof 5 (FIGS. 2 and 3), and also under the floor. The whole arrangement is supported by a frame 6, of which the top elements can be seen in FIG. 1. At one end the room 1 is provided with an inspection door 7. At the other end it leads into a lock chamber 8 in which the handling devices 9 supplied by a transverse conveyor 10 (FIG. 1) can operate.

Over the greater part of the length of the room and over its entire width is disposed a horizontal false ceiling 11 which results in the formation of a vast upper longitudinal duct or passage 12. The height of this duct may be of the order of 2 meters, with the dimensions indicated above by way of example.

Between the floor and the false ceiling 11 are disposed large racks 15 (FIGS. 2 and 3) forming compartments 16 intended to receive the goods 17 which are to be treated and stored, supported by pallets 18 (see in particular FIG. 4). These pallets rest on cross-members 19 forming part of the racking.

The bottom cross-members 19 are disposed at a certain distance from the floor, this distance being about 0.06 meter in the example described, so as to provide longitudinal ducts or passages 14 (FIGS. 1 and 5).

In the present example four longitudinal rack are provided, each of which comprises seven superimposed rows of compartments 16, the compartments of the upper row being slightly higher than the others in order to provide the installation with great versatility. Two of the racks are disposed along the longitudinal walls of the room, near the said walls, and the other two in the centre of the room, so as to form two corridors 20 in which the apparatus (not shown) intended to introduce the pallets and load them into the compartments 16, and to remove them from the latter, can circulate. There is not transverse corridor.

The racks start at some distance from the end wall in which the door 7 is formed, so as to form a vertical duct 21 with which the horizontal ducts 12 and 14 (FIG. 1) are in communication. They stop near the lock chamber 8. Near the end of the room where the door 7 is provided, the upper duct 12 forms a transversal raised, offset portion in which is disposed a battery of refrigerating cells 23, for example four cells disposed in parallel and occupying the entire width of the room. Each of the cells has its own fan 24. They are in addition preceded and followed by orientable shutters 25 enabling the passage of air to be controlled and, when desired, cut off. The circulation of air is indicated by the arrows.

The shutters 25 enable each refrigerating cell to be isolated from the cold air flow in order to permit defrosting or maintenance operation to be carried out without interrupting the operation of the installation.

Suitable partitions 26 and 27 oblige the air to pass through the cells and cut off dead angles.

The compartments 16 of the upper rows, situated upstream of the offset portion 22 and therefore of the cells 23, are arranged to form a kind of tunnel 28 with the aid of longitudinal walls 29 (FIGS. 2 and 3), which, in conjunction with the false ceiling 11 or the vertical walls of the room, enclose the compartments on three sides. The fourth side, which serves for loading and unloading the pallets 18 carrying the goods 17, is provided with a closure means 30 comprising for example a roller apron (FIG. 2) or a raisable shutter (FIG. 3) operated by the handling apparatus.

In the first case the apron winds onto a shaft 31; in the second case the bottom slat is raised and carries the other slat with it with the aid of a balanced drive 32.

The tunnels 28 are provided with a special air circulation arrangement being equipped with fans 33.

The air passes from the tunnels to the cells 23 through an opening 34 provided in the false ceiling 11 in front of a vertical terminal partition 35 which isolates the compartments disposed in tunnels from the other compartments. In FIG. 1 the fans 33 are disposed at the entry of the tunnel and deliver into the latter.

In the modified embodiment shown in FIG. 5, which moreover shows an installation of smaller dimensions, the fans 33 are mounted above the opening 34 and they draw air from the tunnels. Adjusting shutters 36 are provided in the duct 12 upstream of the fans in order to adjust the flow of air passing through the freezing tunnels.

According to a preferred characteristic of the invention, the freezing tunnels are disposed upstream of the refrigerating equipment 23. In this manner the air charged with humidity which comes from the tunnels 28 passes through the evaporator of the refrigerating equipment before being delivered into the cold room, thereby limiting the deposition of frost on the products stored in the cold room.

The installation which has just been described may be used in the following manner:

On their arrival the pallets 18 loaded with goods 17 are disposed in the compartments of the various tunnels 28 with the aid of the handling units, which are provided with forks 37 which can be seen in FIG. 4.

Once enclosed in these tunnels, the goods are subjected to intense bathing by the cold air, and consequently they undergo rapid refrigeration.

The arrangement shown in FIG. 5 offers two advantages: one is the elimination of air leaks through the closure means 30, and therefore the absence of frost; the other consists of the fact that the air is not heated by the fans before passing overs the products. Nevertheless, it has a disadvantage, namely the fact that the products situated at the greatest distance from the fan 34 may be ventilated to a lesser extent. This arrangement will therefore preferably be used for fairly short tunnels.

After passing through the tunnels, the air passes through the cells 23 and is delivered into the upper duct 12. It reaches the lock chamber 8 and circulates longitudinally between the rows of compartments, through the passages 20 and the various longitudinal spaces offered to it, as well as in the lower duct 14. On reaching the vertical duct 21 it passes again partly into the tunnels 28 and partly into the duct 12; the tunnels may for example receive up to three quarters of the air flow.

The goods or products 17 are preferably placed in position and removed with the aid of automatic equipments mounted on rails and circulating in the corridors 20, and also in the lock chamber 8. This provides the advantage of reducing to a minimum the losses through the admission of outside air and of making it unnecessary for personnel to work in the room, which constitutes arduous and dangerous work.

When they have been sufficiently frozen, the goods are withdrawn from the tunnel for storage in the other compartments of the installation. This is achieved without loss of cold, because losses at the outlet of the tunnels are recuperated in the part serving for storage.

During the course of the night or of a cold day it is possible for part of the refrigerating power usually allocated to storage to be transferred to freezing in the tunnels, and, more generally, it is possible to adjust the requirements of cold for storage and freezing.

The goods may also be introduced and their freezing started as soon as they are received, without waiting for the complete filling of the tunnel, and the freezing time of each of the pallets may be adjusted in dependence on the nature of the products loaded on it.

Maintenance is simple because of the elimination of thermal shocks at the outlet of the tunnels and the elimination of mechanical shocks, which the use of automatic, mechanically steered trucks makes it possible to avoid.

In the example illustrated in FIG. 6, two pallets 18 are in position on the cross-members 19 of a rack. Each of these pallets has a raised structure 40 composed of four vertical angle uprights fixed by their bottom end to the pallet and at the other end to a frame 41. One of the side faces of the raised structure is closed by a fixed wall 42.

Fittings, such as the flexible apron 43, may be provided on the edges of the wall in order to effect sealing with neighbouring pallets or other elements of the installation, and the latter may if desired be provided with sealing fittings of the same kind.

The pallets are arranged in the compartments in such a manner that their wall 42 is situated towards the corridor and that when the pallets are in position walls 42 complete the freezing tunnels with the fixed elements 29, thus making it possible to dispense with the closure means 30 previously mentioned.

In FIGS. 7 and 8 the raised structures 40 comprise two opposite side walls 42 joined at the top by a roof 44. Sealing fittings 43 may be provided on all the edges of the walls and of the roof, or only on some of these edges. Only two of these fittings have been shown at one end of FIG. 7, in order not to complicate the drawing.

With pallets provided with enveloping raised structures of this kind it is possible to form the freezing tunnel without the aid of fixed longitudinal walls, because the pallets placed end to end form a sufficiently effective longitudinal tunnel.

The raised structures may in addition be equipped with longitudinal battens 45 permitting the fitting of shelves 46 and bars 47 on which, for example, quarters of meat can be hung.

FIG. 7 shows how they can be placed in position or removed with the aid of an apparatus 38 provided with a rotary head 39 carrying a fork 37 cooperating with the pallet 18. Other conventional types of equipment may be used.

Figure 9:
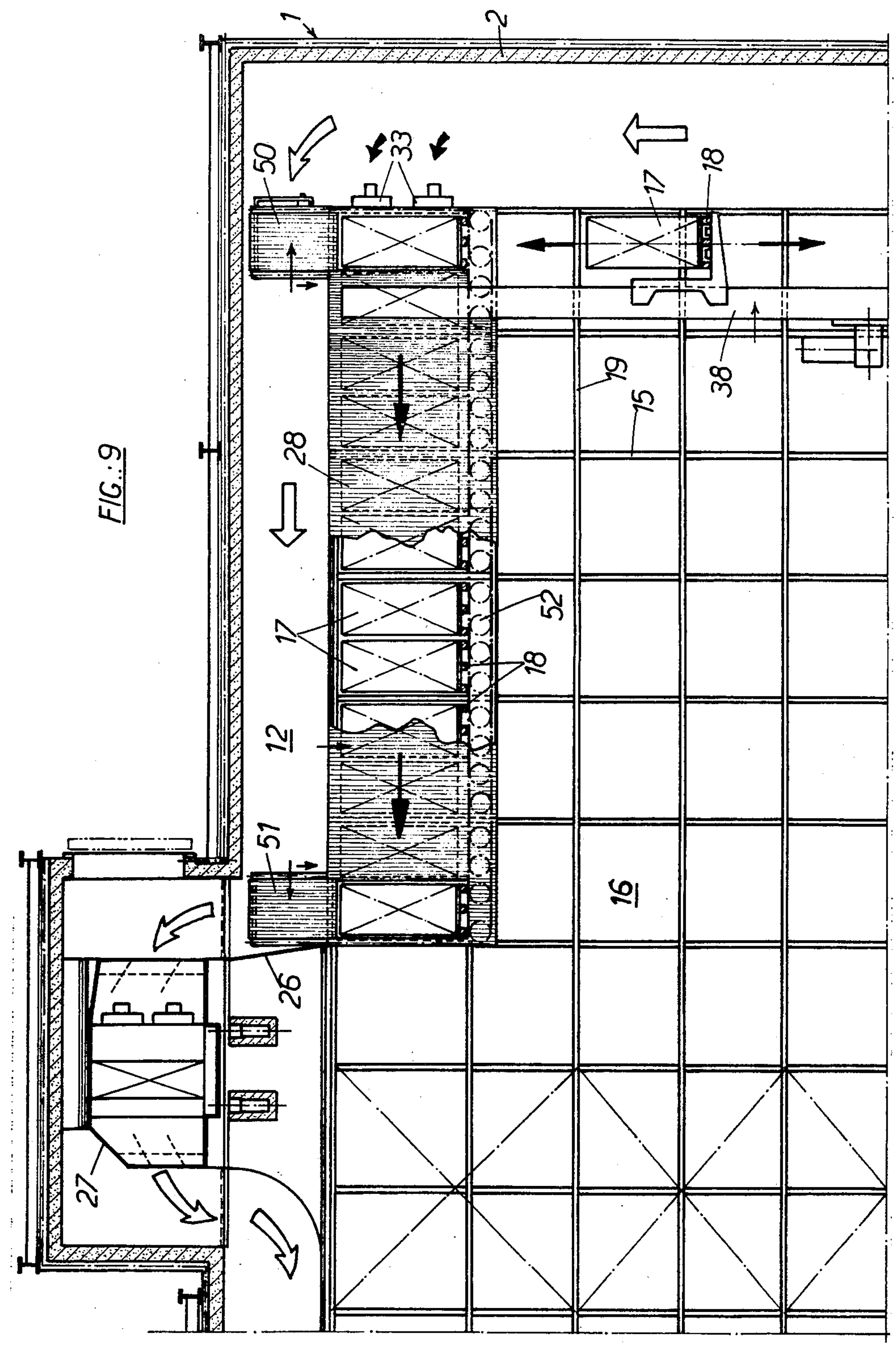
FIG. 9 illustrates diagrammatically an alternative in which the freezing tunnels are provided with longitudinal conveyors.

In the variant shown in FIG. 9 the freezing tunnels are enclosed on four sides with the aid of fixed elements 29 which on the corridor side are provided with inlet and outlet doors 50 and 51, and the pallets 18 loaded with goods 17 can be moved there with the aid of automatic longitudinal conveyors 52.

It is obvious that the embodiments illustrated are only examples and it would be possible to modify them, particularly by the substitution of technical equivalents, without thereby departing from the scope of the invention.

We claim:

1. A freezing and cold storage installation comprising in combination:

an elongated room, the sides of which are provided with thermal insulation;

a plurality of longitudinal racks extending over a major part of the length of said room between the end portions thereof, said racks each being provided with a series of superimposed horizontal rows of compartments adapted to receive goods to be frozen and stored, the compartments of each said rows communicating in a longitudinal direction with one another and with said end portions of said room, the racks having longitudinal corridors therebetween for enabling goods to be introduced into and removed from said compartments;

a longitudinal duct substantially parallel to said rows and communicating with said end portions of said room;

means in said duct for circulating air from one end portion of said room to the other end portion of said room and for cooling said air;

and means for laterally enclosing a series of adjacent compartments in a row and building therewith a tunnel which communicates with one of said end portions of said room and with a said longitudinal duct, whereby air circulation conditions are created within said tunnel for enabling it to be used as a freezing space.

2. The combination of claim 1 wherein said longitudinal duct extends over the whole width of said room above said compartments, said means for circulating and cooling air extending too over the whole width of said room in said duct, openings being provided in the wall of said duct upstream of said circulating and cooling means for allowing communication between said duct and the compartments of said racks respectively located beneath the said openings, said enclosing means being provided for the compartments of the upper rows of said racks located upstream of said openings, whereby a plurality of tunnels are created in the said rows.

3. The combination of claim 2 wherein fans are located in the said tunnels for blowing towards said circulating and cooling means.

4. The combination of claim 3 wherein said fans are located at the inlet of said tunnels.

5. The combination of claim 3 wherein adjusting shutters are located in the said tunnels.

6. The combination of claim 1 wherein said enclosing means comprise fixed walls and movable elements permitting the loading and unloading of said goods.

7. The combination of claim 6 wherein said compartments are adapted to receive pallets on which said goods are loaded.

8. The combination of claim 7 wherein at least a part of said enclosing means is formed by elements with which the pallets are provided.

9. The combination of claim 8 wherein said pallets are provided with raised structures, having side faces adapted to constitute parts of said tunnel.

10. The combination of claim 9 wherein sealing fittings are associated with said structures for ensuring the tightness of said tunnel.

11. The combination of claim 1 wherein said tunnel contains a longitudinal conveyor for conveying said goods.

* * * * *